June 16, 1942.                C. G. RITTENHOUSE                2,286,834
                    LEADERSTRIP FOR CINEMATOGRAPHIC FILM
                              Filed Jan. 16, 1940
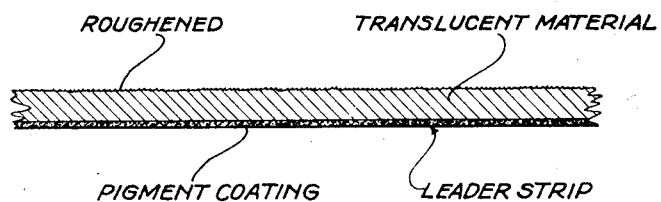
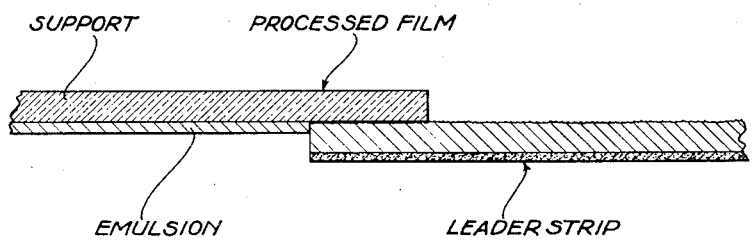
Charles G. Rittenhouse
           INVENTOR
BY
           ATTORNEYS Patented June 16, 1942

2,286,834

UNITED STATES PATENT OFFICE 2,286,834

LEADERSTRIP FOR CINEMATOGRAPHIC FILM

Charles G. Rittenhouse, Rochester, N. Y., assignor to Eastman Kodak Company, Rochester, N. Y., a corporation of New Jersey Application January 16, 1940, Serial No. 314,131

5 Claims. (Cl. 88—19.5)

The present invention relates to photography, and particularly to leader strips which are adapted to be spliced to the ends of processed cinematographic films for the purpose of threading the film through a projector without wasting any of the scenes on the film proper.

After an exposed cinematographic film has been processed, and before it is returned to the customer, a leader strip is usually connected to the forward end of the film. This leader strip is connected to the film in endwise relation therewith for the purpose of facilitating the threading of the film through the projector without necessitating the loss of any scenes carried by the film, and such leader strips are, therefore, generally of such length as to extend completely through the threading path of the projector before the film leaves the supply reel or enters the threading path proper.

Inasmuch as these leader strips, or "customers' leaders" as they are often referred to in the art, must pass through the film feeding mechanism of a projector and cooperate therewith in the same manner as the film itself they must have the same dimensions and film perforations as the film. It has, therefore, been common practice to use lengths of uncoated photographic film as leader strips, said leaders being spliced to the processed film in endwise relation in a known manner. A common splicing operation includes squaring the ends of the film and leader strip, scraping a given width of emulsion from the film, applying film cement to that portion of film scraped clean of emulsion, overlapping the ends of the leader onto the film by an amount equal to the width of emulsion removed therefrom, and pressing the two into surface contact until the film cement dries. It might be pointed out that the film cement does not act strictly as an adhesive, but includes a solvent for the film and leader strip which penetrates and softens the two surfaces to be joined. Thus as the two surfaces softened by the solvent are pressed together they become bonded, so to speak, the material of one intermingling with the material of the other, and after becoming dry the spliced joint has a tensile strength complementary to the film itself.

It was found that when leaders of uncoated film base, or other material having very little density, were used that the change in brightness on the projection screen when passing from the leader strip of the film proper was objectional due to the fact that it was of too great a magnitude. In addition, it was deemed desirable to be able to write the title of a film, or other data relating to the film, on the surface of the leader strip which would be exposed when the film was wound upon the supply roll.

Both of these problems were solved by coating both sides of the leader strip with a pigment coating. The pigment coatings in addition to increasing the density of the leader to reduce the change in brightness on the projection screen when passing from the leader to the film proper, also provided a surface on which one could write. In order to insure the maximum legibility of any writing placed on the surface of the leader these pigment coatings are usually made white.

For some time difficulty has been encountered in obtaining a strong permanent splice between the leader strip and a film with the result that the leaders are continually pulling away from the film. After considerable research I have found that the presence of pigment coatings on both surfaces of a leader strip has several disadvantages principally associated with the splicing of the leader strip to the film, and that the above-mentioned failure of the splice between a leader strip so coated and a film is due to the presence of such a pigment coating on the surface of the leader strip adapted to lie in surface contact with the surface of the film. The detrimental effect of a pigment coating on a strong splice is believed to be due to the fact that the pigment coating cuts down the solvent action of the film cement on the surface of the leader so coated with the result that a bonding of the contacting surfaces of the leader and film is not as great as it would be if the two contacting surfaces were susceptible to the direct action of the solvent in the film cement. This belief is based on the fact that any pigment coating contains one or more inorganic materials which are not acted upon by a solvent for organic material so that the inorganic materials hinder the solvent action of the film cement upon the organic material of which the leader strip is composed. Thus, if the solvent action of the film cement on the surface of the leader strip is reduced as compared to that on an uncoated surface the resulting bonding action between the pigment coated surface of the film will be less than if the two surfaces were uncoated. It is also believed that the splice fails because the pigment particles reduce the area of the contacting surfaces of a splice susceptible to the action of the film cement.

This difficulty can be overcome by scraping the pigment coating from the side of the leader strip adapted to contact the surface of the film, but this introduces an extra step in the splicing operation which prolongs the time necessary to make a splice. In addition, since most splicing apparatus are provided for scraping the coating off of one end of the strips to be joined (the emulsion off of one film end) a splicer having provision for scraping the ends of both strips would have to be designed, or the end of the leader would have to be placed on the same splicing table as the film for the scraping operation, then removed to the other splicing table to continue the splicing operation, including the step of cementing the scraped area of the film, and the proper overlapping of the two ends into surface contact.

Therefore, one object of the present invention is to provide a film leader strip which can be spliced to a film without difficulty, the splice so formed adapted to have a tensile strength equal to that of a splice formed between two uncoated films. Another object is to provide a leader strip of the type described having a surface which can be readily written upon. And a further object is to provide a leader strip of the type described the density of which can be altered with respect to the density of a film strip to control the change of brightness upon a projection screen when passing from the leader strip to a film during projection.

Concisely stated, the leader strip in accordance with the present invention comprises a cellulose derivative strip having a given density, the surface of said strip adapted to engage a film when spliced thereto being roughened, and the other surface of said strip being coated with a pigment coating adapted to increase the density of the strip.

In the drawing, Fig. 1 is a sectional view, on an exaggerated scale, of a portion of a leader strip fabricated in accordance with the present invention; and Fig. 2 shows the manner in which this leader strip is to be spliced in overlapping end wise relation to a processed cinematographic film strip.

A leader in accordance with the present invention may be made from a strip of uncoated cinematographic film, or a strip of any other cellulose derivative material having the dimensions and perforations of such a film strip so that it can be fed through a projector in the same manner as the film itself, see Fig. 1. To one side of this leader strip can be applied in any suitable manner one or more of many known pigment coatings. Such a coating when dry will serve to increase the density of the leader to cut down the amount of light which will be projected upon the screen when the leader is in front of the projection lens of a projector. The resulting density of the leader can be controlled by the kind and amount of pigment contained in the particular coating applied to the leader, and while there is no definite limits within which the density should be held, it is generally desirable to have a density such that the change in brightness on the projection screen during the passing of the leader to the film proper is reduced so as not to startle the person viewing the screen. It has been found desirable in some cases to apply a pigment coating to one side of the film which will be opaque, as a result of which no change in brightness on the screen will be apparent.

The opposite side of the leader is roughened without the addition of any coating to provide a surface which can be written upon. The roughening operation merely serves to remove the reflection properties and give the surface a frosted appearance, and said surface will be as susceptible to the solvent action of the film cement as the film itself so that when the leader is spliced to a film the resulting splice will have the tensile strength of a splice connecting two films. The roughened surface of the leader should be very fine as distinguished from a coarse surface, or one which would result from a very fine sandblasting. While the surface could be roughened by a sandblasting operation, I have found that it is more desirable to use an embossing operation well known in the art. Such an embossing operation might comprise embossing the surface of the leader with a roll having a fine sandblasted surface, and to expedite the embossing operation, to apply a solvent to the surface in advance of the embossing roll to soften the surface and make it more susceptible to the rough surface of the embossing roll. I have found that a particularly suitable embossed surface can be obtained by first applying a thin coating of low precipitation acetate in a suitable solvent to the surface and then embossing this coating in the manner outlined above.

It is pointed out that roughening the surface of a leader strip in the manner outlined will increase the density of the strip to some extent, but the increase in density due to this roughening has been found to be insufficient to warrant the elimination of a pigment coating on one side of the leader strip. In some instances where a change in brightness on the projection screen is not too undesirable it might be found that a satisfactory density would be given the leader by roughening both sides thereof, but I have found that a leader strip having a pigment coating on one surface to control the density of the strip and having the other surface roughened to make it possible to write on the surface gives a leader strip which is satisfactory for most uses.

In the splicing operation the roughened surface of the leader strip will be placed in surface contact with the surface of the film from which the emulsion has been scraped, see Fig. 2, and since this surface has no coating thereon it will be subjected to the solvent action of the film cement to the same extent as will the film itself, whereby, when pressed together, the surfaces of the leader and film will be firmly bonded together. The roughened surface of the leader strip will always be exposed when the film is wound upon a supply roll so that the data written thereon will be visible to a person observing the roll. The surface of the leader strip coated with the pigment coating will always be toward the inside of the roll when the film is wound onto the supply roll and will serve its purpose of giving the leader a desired density without affecting the splicing characteristics in any way.

Although the present invention has been described in connection with the specific details of an example embodying it, it is not intended that these details can be regarded as limitations upon the scope of the invention, except in so far as included in the accompanying claims.

Having thus described my invention, what I claim is new and desire to secure by Letters Patent of the United States is:

1. A leader strip adapted to be spliced to a processed cinematographic film in overlapping endwise relation and comprising a strip of translucent material, the surface of said strip adapted to be in surface contact with said film roughened to provide a surface which can be written upon, and the opposite side of said strip coated with a material for increasing the density of said strip.

2. A leader strip adapted to be spliced to a processed cinematographic film in overlapping endwise relation and comprising a strip of material of the same composition as said film, the side of said strip adapted to be in surface contact with said film when spliced thereto roughened to provide a surface which can be written upon and adapted to increase the density of said strip, and the opposite side of said strip coated with a material adapted to increase the density of said strip.

3. A leader strip adapted to be spliced to a processed cinematographic film in overlapping endwise relation and comprising a strip of transparent material of substantially the same weight and composition as the film, the side of said strip adapted to be in surface contact with said film when spliced roughened to provide a surface which can be written upon, and the opposite side of said strip coated with a material adapted to make the strip opaque.

4. A leader strip adapted to be spliced to a processed cinematographic film in overlapping endwise relation and comprising a strip of material having a given density, the side of said strip adapted to be in surface contact with said film when spliced thereto roughened to provide a surface which can be written upon, and the opposite side of said strip coated with a pigment coating adapted to increase the density of said strip.

5. A leader strip adapted to be spliced to a processed cinematographic film in overlapping endwise relation and comprising a strip of cellulose derivative material having a given density, the side of said strip adapted to be in surface contact with said film when spliced thereto roughened to provide a surface which can be written upon, and the opposite side of said strip coated with a pigment coating adapted to increase the density of said strip.

CHARLES G. RITTENHOUSE.